(12) United States Patent  (10) Patent No.: US 8,217,940 B2
Burley et al.  (45) Date of Patent: Jul. 10, 2012

(54) DIRECTABLE LIGHTING METHOD AND APPARATUS

(75) Inventors: Brent Burley, Monterey Park, CA (US); Charles Tappan, Burbank, CA (US); Daniel Teece, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1021 days.

(21) Appl. No.: 12/178,311

(22) Filed: Jul. 23, 2008

(65) Prior Publication Data
US 2009/0027391 A1   Jan. 29, 2009

Related U.S. Application Data

(60) Provisional application No. 60/951,450, filed on Jul. 23, 2007.

(51) Int. Cl.
*G06T 15/50* (2006.01)
(52) U.S. Cl. ..................................................... 345/426
(58) Field of Classification Search ................... 345/426
See application file for complete search history.

(56) References Cited

U.S. PATENT DOCUMENTS

| | | | | |
|---|---|---|---|---|
| 6,549,203 | B2 * | 4/2003 | Randel | 345/426 |
| 7,061,488 | B2 * | 6/2006 | Randel | 345/426 |
| 7,969,438 | B2 * | 6/2011 | Xie | 345/426 |
| 2006/0209067 | A1 * | 9/2006 | Pellacini et al. | 345/426 |
| 2007/0176926 | A1 * | 8/2007 | Garcia et al. | 345/426 |
| 2007/0294270 | A1 * | 12/2007 | Gregory et al. | 707/100 |

* cited by examiner

*Primary Examiner* — Edward Martello
(74) *Attorney, Agent, or Firm* — Kilpatrick Townsend & Stockton LLP

(57) ABSTRACT

A method for a computer system includes receiving a plurality of values for an illumination parameter associated with an illumination source for a scene, determining a plurality illumination contributions for a surface of an object within the scene, in response to the plurality of values, determining a plurality of texture maps associated with the surface of the object in response to the plurality of illumination contributions, wherein each of the plurality of texture maps is associated with each of the plurality of values for the illumination parameter, receiving a value for the illumination parameter at render time from a user, determining a texture map associated with the surface of the object, in response to the value for the illumination parameter and in response to the plurality of texture maps, rendering the surface of the object using the texture map to form an image, and displaying the image to the user.

28 Claims, 6 Drawing Sheets

DIRECTABLE LIGHTING METHOD AND APPARATUS

CROSS-REFERENCE TO RELATED APPLICATIONS

This application claims the benefit of U.S. Provisional Application No. 60/951,450, filed Jul. 23, 2007, entitled "Directable Lighting Method and Apparatus," which disclosure is incorporated herein by reference for all purposes.

BACKGROUND OF THE INVENTION

The present invention relates to computer generated imagery. More specifically, the present invention relates to methods and apparatus for interactive specification of illumination parameters.

Throughout the years, movie makers have often tried to tell stories involving make-believe creatures, far away places, and fantastic things. To do so, they have often relied on animation techniques to bring the make-believe to "life." One major path in animations has included traditional drawing-based animation techniques.

Drawing-based animation techniques were refined in the twentieth century, by movie makers such as Walt Disney and used in movies such as "Snow White and the Seven Dwarfs" (1937) and "Fantasia" (1940). These animation techniques typically required artists to hand-draw (or paint) animated images onto transparent media such as cels. After painting, each cel would then be captured or recorded onto film as one or more frames in a movie.

With the widespread availability of computers in the later part of the twentieth century, animators began to rely upon computers to assist in the animation process. This included using computers to facilitate drawing-based animation, for example, by painting images, by generating in-between images ("tweening"), and the like. Walt Disney's first full-length movie combining computer generated imagery (e.g. animation) and hand drawn animation was "Beauty and The Beast" (1991). Walt Disney's first full-length movie that included only computer generated images (CGI) was "Chicken Little" (2005).

In the CGI field, the term "rendering" generally refers to the process of converting a mathematical description of a scene into one or more images. Typical types of input data (scene descriptor) for the rendering process includes a description of geometry of one or more objects in a scene, description of surface properties (shading properties) of objects in a scene, description of camera positions, and description of illumination sources. Currently, the input data may be on the order of gigabytes. The rendering process includes modeling the interaction of light from the illumination sources with the objects in the scene to determine what the scene should look like from the camera's point of view.

For "film-quality" (high resolution) computer rendering, images may take hours to render even using state-of-the-art CPUs. Using traditional techniques, the input data is retrieved from a scene descriptor file, or the like, and loaded into memory. Next, a rendering engine, or the like, processes the input data to generate the output image overnight. If the user is unsatisfied with the parameters of the output image, the input data is modified, and the rendering process repeated. Because the rendering process is, in practice, an iterative process, users often spend a lot of time waiting to see if the changes in input they make result in acceptable visual images.

In light of the above, what is desired are improved methods and apparatus for accelerating the visualization process.

BRIEF SUMMARY OF THE INVENTION

The present invention relates to computer generated imagery (e.g. animation). More specifically, the present invention relates to methods and apparatus for providing users with interactive and iterative adjustment in illumination parameters.

As mentioned above, rendering models the interaction of light with objects. Thus, illumination parameters are a major aspect in determining the appearance of a scene. A user who typically specifies and adjusts the illumination parameters is often termed a "lighter." In various embodiments, a lighter may add sources of illumination in a scene, may specify where the illumination source is positioned and directed, may specify the angle (e.g. barn door effect) of illumination, may specify the softness or hardness of the illumination source, may specify the intensity profile of the illumination, may specify the intensity and/or color of the illumination, and the like.

As will be described herein, methods and apparatus are provided that allow the lighter to apparently define and adjust illumination parameters from multiple illumination sources more efficiently. Thus, a lighter may control and adjust illumination parameters and quickly view the effect of the changes in illumination parameters. A lighter may also control and adjust illumination parameters for one light source and then another, with the results for each light source being accumulated in an illumination texture map. These methods may be used in pre-production rendering, i.e. to assist the lighter is setting illumination parameters, and also used in production rendering to determine the final image.

One aspect of the present invention relates to a method for a computer system. A first image can be rendered using a three dimensional ("3 D") model of an object and an illumination texture map associated with the 3 D model. The illumination texture map has initial texel values that are based at least in part on an effect of a first light source on a surface of the 3 D model. User input selecting illumination parameters for a second light source is received. An updated image of the object is rendered using the illumination texture map; rendering the updated image includes calculating an effect of the second light source on the surface of the 3 D model such that the updated image shows a cumulative effect of the second light source and the first light source. The effect of the second light source can be accumulated into the illumination texture map by updating one or more of the texel values based on the effect of the second light source. The updated image is displayed (e.g., on a monitor of a computer system), and the illumination texture map including the one or more updated texel values is stored (e.g., to computer memory, magnetic or optical disk or other storage media). The illumination texture map can be used in further rendering operations, including production rendering.

Another aspect of the invention pertains to another method for a computer system. A 3 D model of an object and an illumination texture map associated with the 3 D model are obtained. The illumination texture map having initial texel values, which can be determined, e.g., from a previously applied illumination source or by initializing the texel values to a state representing no light. A number of lighting iterations are performed, with each iteration using a different light source as a current light source. In each iteration, user input selecting parameters for the current light source is received, and an updated image of the object is rendered using the illumination texture map; the rendering process advantageously includes calculating an effect of the current light source on a surface of the 3 D model, with the rest of the lighting effect being provided by the illumination texture map. As a result, the updated image includes a cumulative effect of the current light source and all of the light sources used in any previous iterations. The effect of the current light source can be accumulated into the illumination texture map by updating one or more of the texel values based on the effect of the current light source. The updated image is displayed (e.g., on a monitor of a computer system), and the (updated) illumination texture map including the one or more updated texel values is stored (e.g., to computer memory, magnetic or optical disk or other storage media). Any number of light sources can be treated iteratively in this method, and at each iteration the user can determine whether to keep the updated illumination texture map or revert to the previous map. Once all iterations over light sources are complete, one or more final images (e.g., production images) can be rendered using the illumination texture map.

Another aspect of the invention relates to another method for a computer system. A number of different values for an illumination parameter associated with an illumination source for a scene can be received. Illumination contributions for a surface of an object within the scene can be determined in response to each of the received values. Multiple texture maps associated with the surface of the object can be determined in response to the illumination contributions, with each of the texture maps being associated with a different one of the received values for the illumination parameter. At a later time (e.g., render time), a render time value for the illumination parameter is received from a user, and one of the texture maps is selected based on the render time value for the illumination parameter. The surface of the object is rendered using the selected texture map to form an image, and the image is displayed to the user. In this aspect, a user can build up a library of texture maps that can then be combined to produce a combined illumination effect.

In other aspects, a processor of a computer system is configured to perform methods described herein. In still other aspects, computer-executable code configured to direct a processor to perform methods described herein can be stored on a computer readable storage medium.

The following detailed description together with the accompanying drawings will provide a better understanding of the nature and advantages of the present invention.

DETAILED DESCRIPTION OF THE INVENTION

Figure 1:
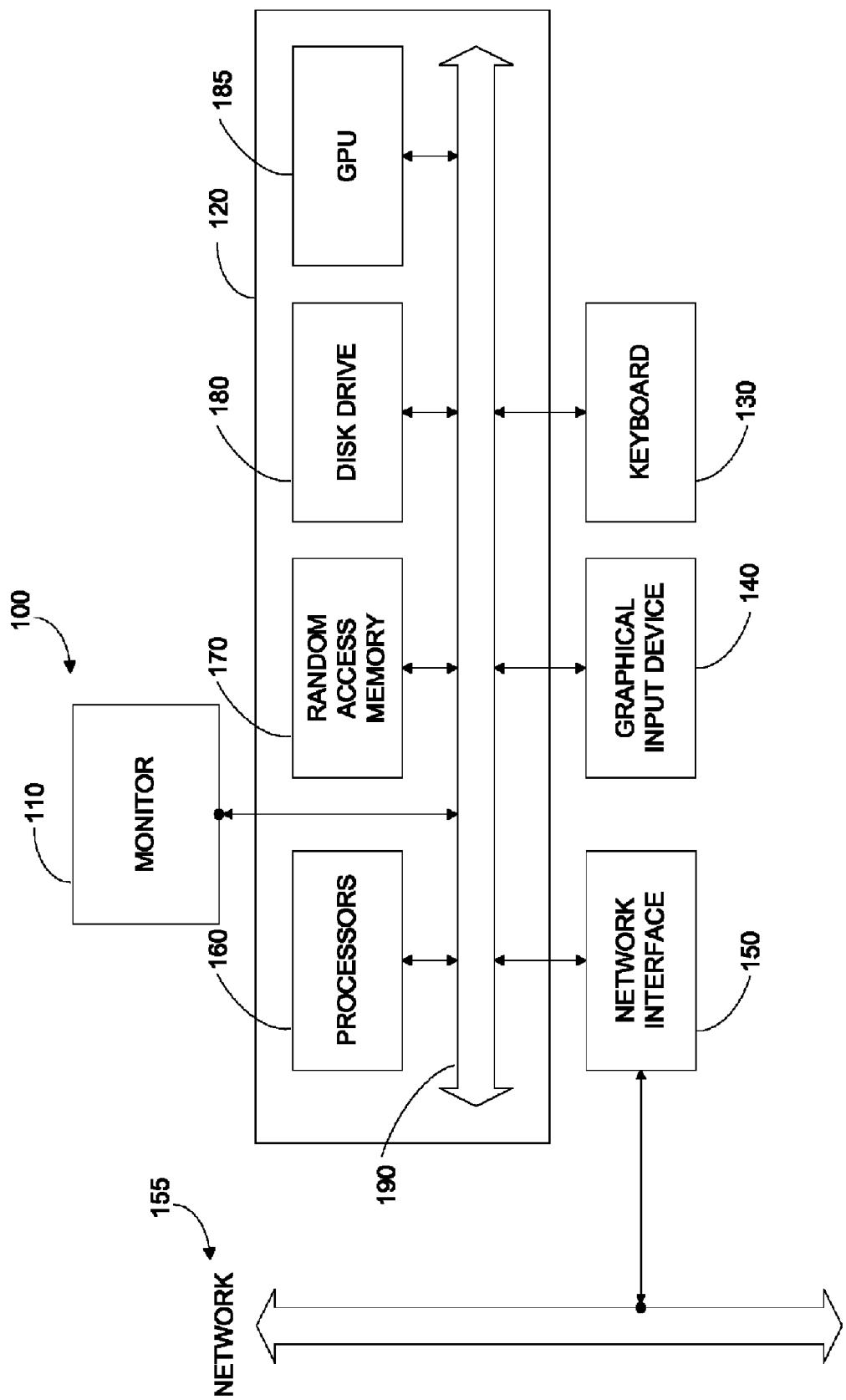
FIG. 1 is a block diagram of typical computer system according to an embodiment of the present invention.

CGI lighting techniques can be used to provide realism by simulating the effect of well-defined light sources on objects in a scene being rendered, rather than simply relying on the intrinsic coloration of the objects (which tends to produce a flat, cartoonish look). These techniques generally begin with defining some number of virtual light sources that will be used to illuminate a scene. Much like lights on a live-action movie set, virtual light sources can be placed in various positions inside or outside the scene and positioned to illuminate objects in the scene. For each virtual light source, the user specifies various properties corresponding to properties of real-world light, such as shape and size of the source (e.g., bar, bulb, point-source), brightness, color and/or color temperature, directionality (e.g., collimated, omnidirectional), intensity profile and falloff with distance, edge effects (e.g., a "barn door" effect that sharply cuts off the intensity), and so on; particular properties can vary depending on the rendering application. The object models used to represent objects in the scene can include surface properties that specify how an object's surface interacts with light; examples of such properties include reflectivity; reflection quality (specular and/or diffuse), transparency, refraction, etc. Other surface properties that can be specified for an object, such as surface normals, color, etc., also affect the interaction with light.

During rendering, the interaction of light from the simulated light source(s) with the objects in the scene can be determined, e.g., using ray tracing techniques that determine how much light falls on which portion of an object from which angle, then using the surface properties of the object to determine the light's subsequent behavior (e.g., how much and in which direction(s) it reflects). A number of different computational techniques for calculating lighting effects are known; particular techniques are not critical to understanding the present invention. In general, regardless of the particular technique, the computation time increases with the number of light sources and complexity of the scene.

Embodiments of the present invention relate to "directable lighting" systems and methods that can simplify and accelerate the task of determining how a CGI scene is to be lit as well as the subsequent task of rendering the lit scene. In certain embodiments, results of lighting computations for an object (e.g., color values representing the effect of a light source on the object) can be stored as a texture for the object.

As is well known in the art, a texture map associates a value of some surface property with coordinates in a texture space (usually, though not necessarily, two-dimensional). Locations on the surface of a modeled object are mapped to coordinates in the texture space, thereby establishing an association between surface property values and locations on the surface of the object. Any property of a surface can be represented using a texture map.

In embodiments of the present invention, the appearance (e.g., color) of a surface under specified illumination conditions, once it has been computed, can be treated as a surface property that is stored as a texture (sometimes referred to herein as an illumination texture). As long as the same illumination conditions persist, the lighting effect can be achieved during rendering by applying the illumination texture to the surface, thus saving the computational burden of recalculating the lighting effect.

Some embodiments further exploit the fact that in the real world, effects of multiple light sources striking an object are cumulative. Realistic results can be achieved by modeling the effects of different light sources separately, then adding the effects together. It is therefore unnecessary to compute the effects of all the light sources at once. Instead, just one light source (or group of light sources) can be applied to an object or scene and the results stored as an illumination texture. If a second light source (or group of light sources) is added, lighting computations are needed only for the second light source; the effect of the first light source can be applied using the texture (a much faster computation). The effect of the second light source can be accumulated into the illumination texture. Repeating this process, a user can build up a lighting scheme of arbitrary complexity (e.g., many light sources) without requiring extensive recalculation as adjustments are made. The process can thus become more akin to the task of lighting a live-action movie scene, where lighting designers typically add a few lights, study the effect, add more lights, and so on until the desired look is achieved.

FIG. 1 is a block diagram of typical computer system 100 according to an embodiment of the present invention.

In the present embodiment, computer system 100 typically includes a monitor 110, computer 120, a keyboard 130, a graphical input device 140, network interface 150, and the like.

In the present embodiment, graphical input device 140 can be embodied as a computer mouse, a trackball, a track pad, a joystick, wireless remote, drawing tablet, voice command system, eye tracking system, and the like. Graphical input device 140 typically allows a user to select objects, icons, text and the like that appear on the monitor 110 via a command such as a click of a button or the like.

Embodiments of network interface 150 can include an Ethernet card, a modem (telephone, satellite, cable, Integrated Services Digital Network (ISDN)), (asynchronous) digital subscriber line (DSL) unit, FireWire interface, Universal Serial Bus (USB) interface, and the like. For example, network interface 150 may be coupled to a local area network, to a FireWire bus, or the like. Network 155 can include one or more other computers with processing and/or storage capability; such computers may be directly or indirectly connected to each other and to computer system 100. In other embodiments, network interface 150 may be physically integrated on the motherboard of computer 120 and/or include software drivers, or the like.

In various embodiments, computer 120 typically includes familiar computer components such as a processor 160; storage devices, such as a random access memory (RAM) 170 and disk drives 180; an optional graphics processor (GPU) 185; and a system bus 190 interconnecting the above components. Processor 160 executes computer-readable code to perform various operations; the code typically resides on a tangible storage medium, such as a semiconductor medium (e.g. RAM 170, flash memory), magnetic medium (e.g. hard disk such as disk drive 180), optical medium (e.g. CD, DVD, barcode, holograph), or the like. Computer 120 may include an interface unit for removable storage media (not shown in FIG. 1) to facilitate reading of program code from media such as CD, DVD, removable flash memory cards, or the like. The storage medium can be local to computer 120 or accessible via network 155 (e.g., as a Storage Area Network). Processor 160 can invoke optional GPU 185 to accelerate some or all aspects of code execution as is known in the art.

In one embodiment, computer 120 includes one or more Core™ microprocessors from Intel. Further, in the present embodiment, computer 120 typically includes a UNIX based operating system.

In various embodiments, computer system 100 may also include software that enables communications over a network such as the well-known HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In various embodiments, GPU 185 may be used to perform some of the techniques described below.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or WindowsXP™ or the like from Microsoft Corporation, Solaris™ from Sun Microsystems, LINUX, UNIX, and the like. In still other embodiments, the techniques described above may be implemented upon a chip or auxiliary processing boards.

Figure 2:
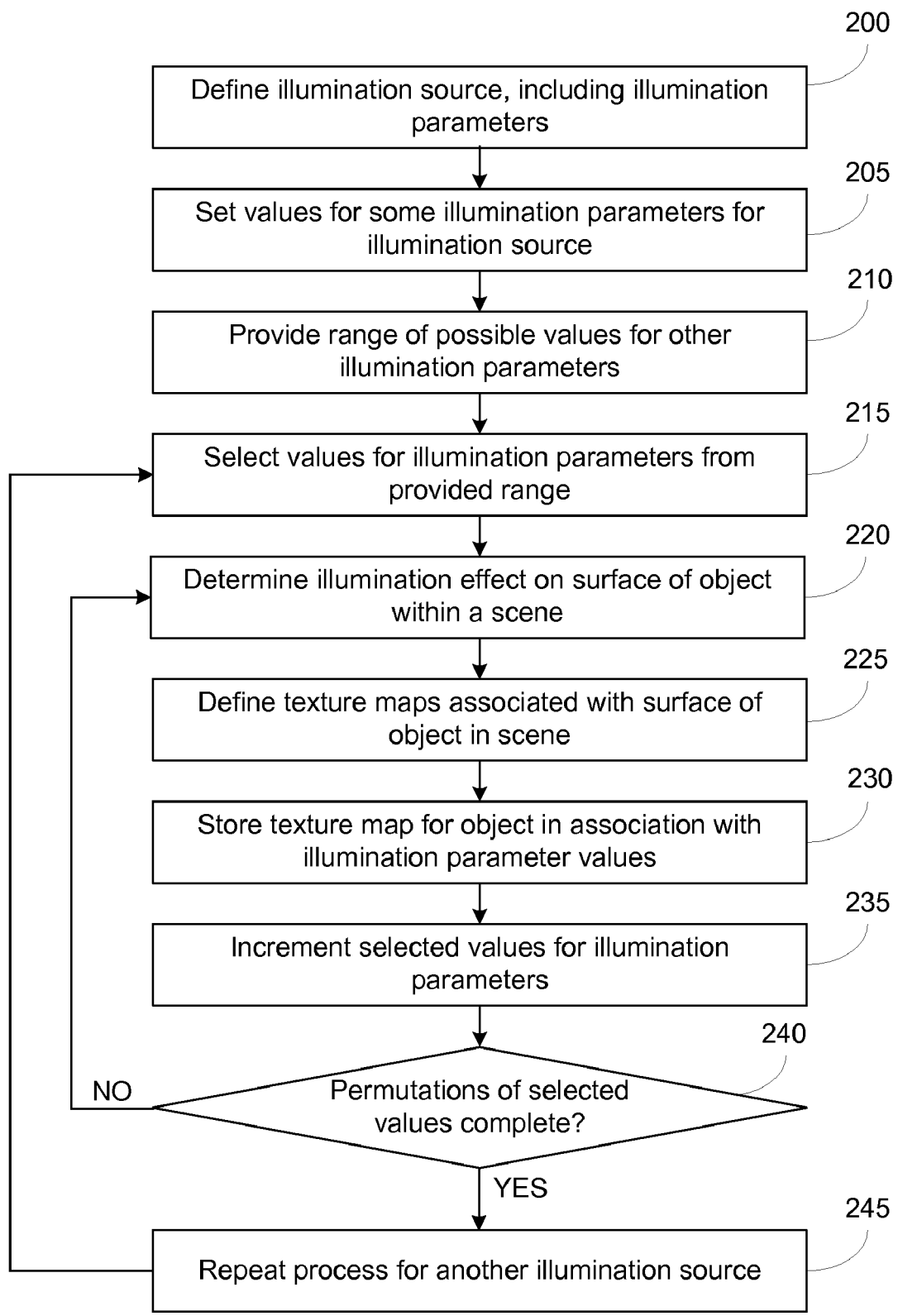
FIG. 2 is a flow diagram of a process according to an embodiment of the present invention.

FIG. 2 illustrate a block diagram of a process according to an embodiment of the present invention. More specifically, FIG. 2 illustrates a pre-production process for determining illumination texture maps associated with objects according to some embodiments of the present invention.

Initially, a specification of an illumination source (also referred to as a light source) is determined, step 200. In various embodiments, a user, e.g. a lighter, specifies an illumination source to provide light for a scene. The illumination source may have any number of parameters that are used to define how the illumination from the source appears in a scene (i.e., how it strikes the surface of objects within the scene). As an example, the parameters may include positioning parameters such as location of the source and/or orientation/direction of the light, color of the light, softness (or hardness) of the light, how sharp a cut-off is for the light (e.g. using a virtual barn door), intensity profile for the light beam, intensity of the light, and the like.

In some embodiments of the present invention, the user may set specific values for certain illumination parameters at step 205 and provide a range of possible values for other illumination parameters at step 210. In some embodiments, a user may not know exactly what value to define for certain illumination parameters to achieve a particular artistic look; accordingly in various embodiments, the user may simply define a possible range of values and experience the results as described herein.

In various embodiments, for any illumination parameters that are defined as a range of possible values, a default value from the respective range of values for the illumination parameter may be selected at step 215. In one example, for these illumination parameters, the values are initially set to the lowest value from the respective range of values.

Next, in response to the selected values (and to any values set by the user in step 205), the illumination effect on a surface of an object within a scene is determined at step 220. In other words, the scene (or an object in the scene) is rendered using the combination of user-set and system-selected values for the illumination parameters. In various embodiments, the surfaces of objects within a scene will be illuminated by the illumination source; any number of objects can be in the scene and illuminated by the illumination source. For example, the surface of an object may appear reddish because of a red spot light, the surface of the object may be dimly lit because of a low intensity light, and the like.

In various embodiments, the appearance of surfaces of the objects is then used to define texture maps (also referred herein as illumination texture maps) associated with the respective objects, step 225. This step may include conventional techniques to map the surface of objects to respective texture maps that are populated with illumination information based on the light striking the surface at particular points. For instance, a location on the surface that corresponds to coordinates of a texel in the texture map can be determined, and the illumination can be sampled at that location to determine the texel value.

In some embodiments of the present invention, the texture maps for the objects, as well as the associated illumination parameters used to generate the texture maps are then stored in memory, step 230. For example, the illumination texture maps for a particular object under different illumination sources and/or illumination parameter values can be stored in a "library" of illumination textures. These illumination parameters and associated texture maps may then be used in other processes, such as processes described below.

In various embodiments, a value for one of the illumination parameters that was specified as a range is incremented (e.g., increased) to a new value, step 235, and if the new value for the illumination parameter is a valid permutation of illumination parameters, step 240, the process may be repeated with this new value. In the present example, when permutations of illumination parameters for one illumination source are complete, the process can repeat for another illumination source, step 245. Thus the process can continue until any number of illumination sources and combinations of illumination parameters have been considered. If each such combination is stored in a library, an extensive library can be developed. Using such a library, a user can view and compare the effects of different parameter settings with relative ease because viewing an image with particular illumination parameters requires only applying the appropriate texture map to the surface, which is much less computationally intensive (and therefore faster) than calculating the effect of the light from the illumination parameters.

Figure 3:
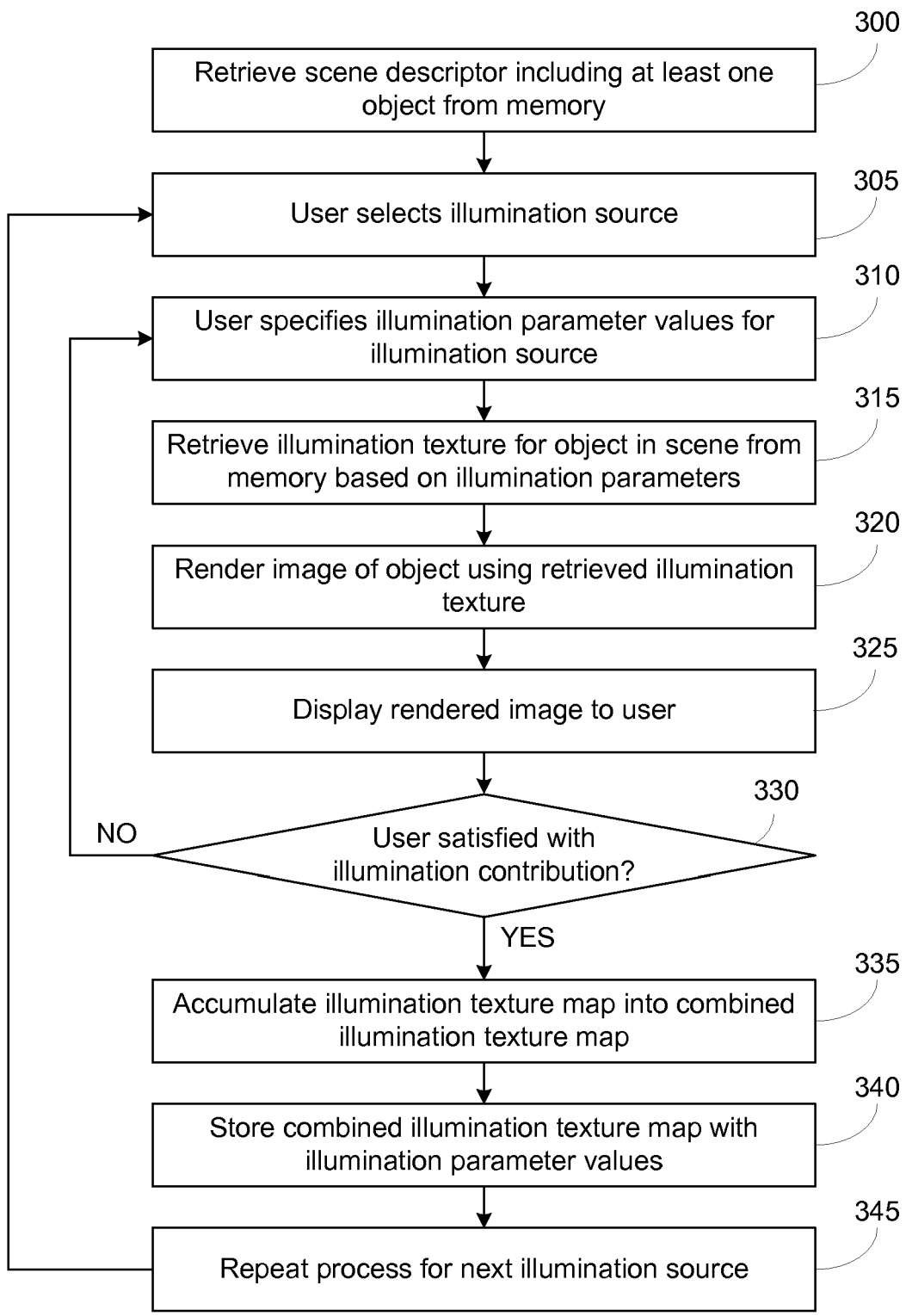
FIG. 3 is a flow diagram of a process according to an embodiment of the present invention.

FIG. 3 illustrates a block diagram of a process according to an embodiment of the present invention. More specifically, FIG. 3 illustrates a process for rendering an image. This process can use illumination texture maps created, e.g., using the process of FIG. 2.

Initially, the scene descriptor, including a specification of an object and illumination sources, are retrieved from memory, step 300. As discussed above, the illumination sources may include some illumination parameters with fixed values and other illumination parameters that are associated with a range of possible values.

In various embodiments, a user, e.g., a lighter, selects a light source at step 305. This may be a light source for which one or more illumination texture maps were determined using the process of FIG. 2.

In various embodiments of the present invention, the user may specify values for the illumination parameters for the illumination source at step 310. In some embodiments of the present invention, a control panel having control knobs, sliders, or the like may be used, where values for illumination parameters may be mapped to each control input. Thus, the user may increase or decrease the illumination parameter by rotating a knob, sliding a slider, selecting a switch, or the like. As examples, the user may increase or decrease a brightness value for the light source via rotating a knob; a color of the light may be changed by sliding a slider; the hardness of the light be changed by a moving scroll wheel; and so on. Many other types of user interfaces are contemplated in other embodiments.

Software-based input systems are also contemplated in various embodiments. For example, a virtual knob, slider, or the like may be represented on a display, and the value may be set via graphical input device (e.g. mouse and cursor; light pen and cursor; and the like). As examples, a virtual color chart may be displayed, and the user may use the graphical input device to directly pick the color of the illumination; a keyboard may be used to type-in a value for the parameter on a display screen; etc.

In various embodiments of the present invention, based upon the defined values of the illumination parameters for the selected illumination source, an illumination texture map associated with each object in the scene is retrieved from memory (e.g., a library as described above) at step 315. As was described above with reference to FIG. 2, various combinations of illumination values were selected, and images were rendered based upon these illumination values. The images were then used to determine a texture map respectively associated with each object in the scene. As discussed above, these texture maps thus represent the effect of the first illumination source on the object within the scene.

Next, based upon these texture maps, an image of the scene including the objects is rendered at step 320. Because the lighting effects of various illumination sources in the scene were baked into texture maps, these illumination sources need not be recomputed during this step. In various embodiments, because determining the effect of light in a scene is computationally intensive, removing the evaluation of illumination sources in this step greatly accelerates the image rendering process.

In various embodiments, the rendered image is displayed to the user on a display at step 325. In some embodiments of the present invention, the rendering engine is the production rendering engine, and not a "light weight" preview rendering engine. An advantage to such embodiments is that the user sees an accurate representation of the illumination source within the rendered image.

In various embodiments, as the user views the image, the user may decide, at step 330, whether the illumination contribution of the light source is satisfactory. This can be an esthetic judgment. For example, the user may decide that the lights need to be brighter, the colors need to be more vivid, the light needs to be softened, or the like. In such cases, the user may indicate that adjustment is needed, and the process returns to step 310 to allow the user to adjust the appropriate knobs, or the like, and view the effect on the rendered image.

In the present embodiment, once the user indicates satisfaction with the contribution the illumination source has on the appearance of the image (step 330), the texture map representing that contribution may be accumulated (e.g., added) into a combined texture map at step 335. As the process iterates, the combined texture map will represent the contributions of multiple illumination sources to the appearance of the surface of an object.

In various embodiments of the present invention, if the user is satisfied with the contribution of the first illumination source, the selected values of the illumination parameters may be stored along with the combined texture maps at step 340, e.g., in memory or on disk or other storage medium. Accordingly, in various examples, illumination parameters for the first light source can become completely defined, and the lighter's job would be complete for this illumination source.

The process can then be repeated for the next illumination source at step 345. More specifically, the user can adjust the values for the illumination parameters for other illumination sources (e.g. a second illumination source), see what the effect is on the rendered image, and adjust the illumination parameters. Additionally, the combined texture map, representing illumination contributions from multiple illumination sources, may also be stored.

In additional embodiments of the present invention, in step 325, the combined illumination texture map may also be displayed to the user, for instance by being applied to the object in the scene. In other words, the illumination contributions from previous illumination sources may be viewed at the same time as the user is adjusting parameters of another illumination source. In such embodiments, the user can then see the effects of the changes in values for the illumination parameters in context with other illumination sources.

Figure 4:
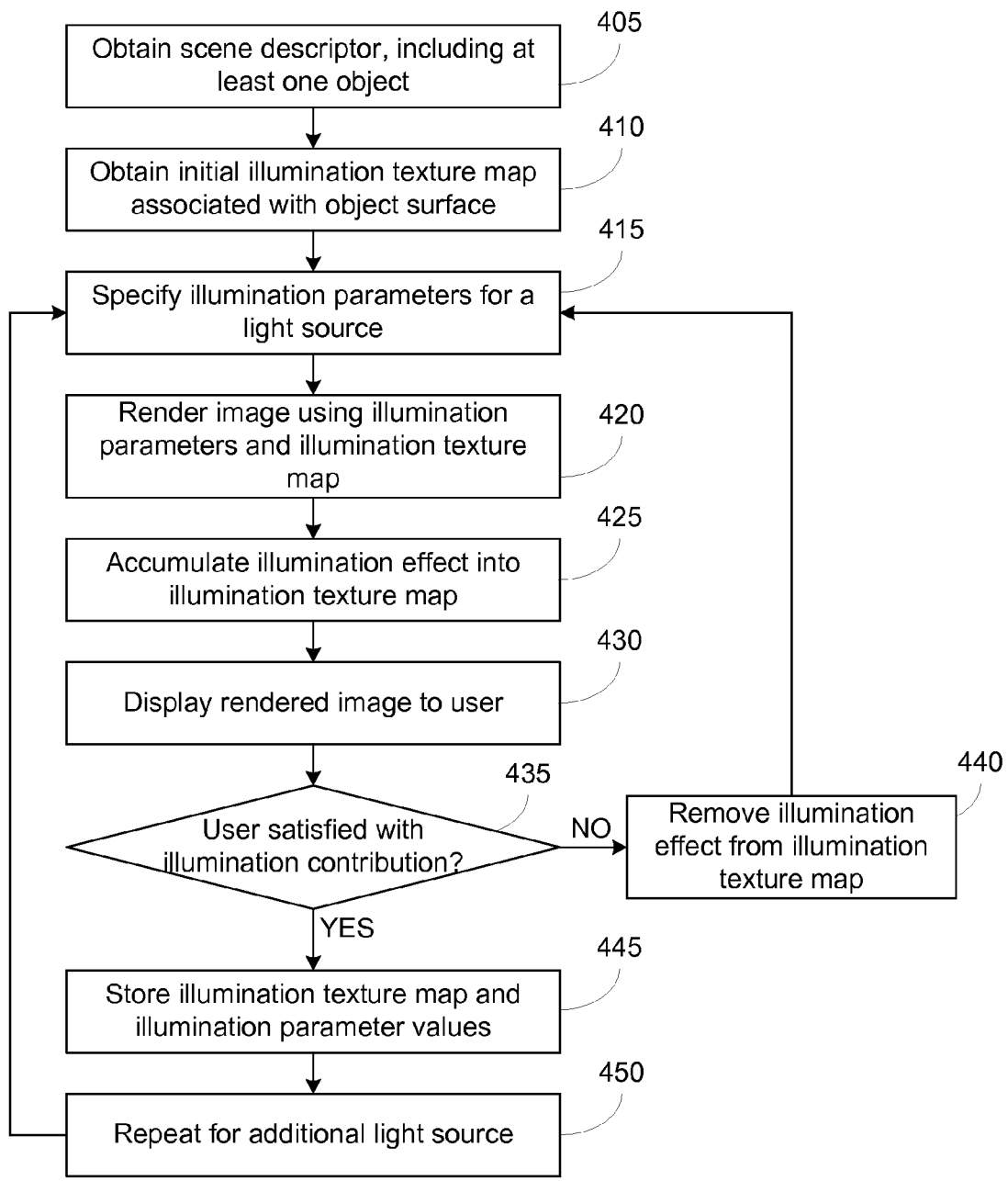
FIG. 4 is a flow diagram of a process according to an embodiment of the present invention.

Those skilled in the art with access to the present disclosure will recognize that the processes described above enable a user to iteratively assemble an illumination texture map that includes contributions from multiple illumination sources. FIG. 4 further illustrates this iterative process. At step 405, a scene descriptor, including at least one object, is obtained. For instance, the user may provide a location in memory or other storage from which the scene descriptor can be retrieved. As noted above, a scene can include any number of objects; it may be desirable to use a simple scene containing one object for the present method or to use a more complex scene with multiple objects. At step 410, an initial illumination texture map is obtained. For instance, the user can select an illumination texture map from a library created using the process of FIG. 2 described above. Alternatively, the initial illumination texture map can be generated as a texture map with all texels initialized to a "no-light" state. At step 415 a user specifies illumination parameters for a light source (or in some embodiments, multiple light sources such as an array of light sources). Specifying the illumination parameters can include the user defining the parameters, or the user can define a range of possible values while the system that implements the process selects particular values within the range. Any of the parameters and techniques for setting or selecting parameter values described above can also be used at step 415.

At step 420, an image is rendered using the illumination parameters specified at step 415 and the existing illumination texture map (initially defined at step 410). Rendering at step 420 includes determining the effect of the light source specified at step 415 on the surface of an object in the scene (similar to step 230 of FIG. 2 described above). At step 425, the illumination effect determined during rendering is accumulated (e.g., added) into the illumination texture map associated with the surface of an object. (In one embodiment, the illumination texture map is initially set to a "no-light" state, allowing the user to add lights, e.g., one by one.) At step 430 the rendered image is displayed to the user.

At step 435, the user indicates satisfaction (or lack thereof) with the effect of the light source. As noted above, this may be an esthetic judgment that depends on a "look" the user desires to achieve. If the user is not satisfied, then at step 440, the illumination effect is removed from the illumination texture map (undoing the accumulation at step 425), and the process returns to step 415 to allow the user to try different illumination parameters; this may include changing parameters and/or introducing an entirely different light source. In another embodiment, accumulating of the illumination effect into the illumination texture map (step 425) can be deferred until after the user indicates satisfaction with the effect at step 435.

If, at step 435, the user indicates satisfaction, then at step 445, the illumination texture map (including the effect added at step 425) is stored, e.g., in a memory or disk file or other storage medium. The illumination parameters used to generate the current illumination texture map can also be stored along with the map itself. At step 450, the user can repeat the process for an additional light source. Thus, the user can iterate over any number of light sources and judge the incremental effect of each light source on the image, gradually building up to a final illumination texture map representing contributions from any number of light sources with defined illumination parameters. In one embodiment, accumulation at step 425 can be done by adding illumination values for the currently specified light source to the texel values already in the illumination texture map. Some embodiments allow "negative light," as when a light creates a shadow on a portion of the object. Other embodiments may allow other types of accumulation. For instance in some representations of color, a tint can be applied by multiplication. In other embodiments, nonlinear accumulation can be used, such as a power function.

It should be noted that the process of FIG. 4 can be applied to any number of objects in a scene; in some embodiments, a scene could consist of a single object. Each object can have its own illumination texture map (or possibly multiple maps if the object's surface is complex).

Because the illumination texture map stores the cumulative effect of any previously applied light sources, rendering is accelerated in that only the effect of the current light source (i.e., the light source specified at step 415) needs to be computed; the illumination texture map supplies the rest of the illumination effect from any previously applied light sources. Further, in some embodiments, if the current light source and its parameters match a light source that is in a library of illumination textures (e.g., generated using the process of FIG. 2), there is no need to recompute its effects; the appropriate illumination texture map can be retrieved from the library and applied to the object.

Figure 5:
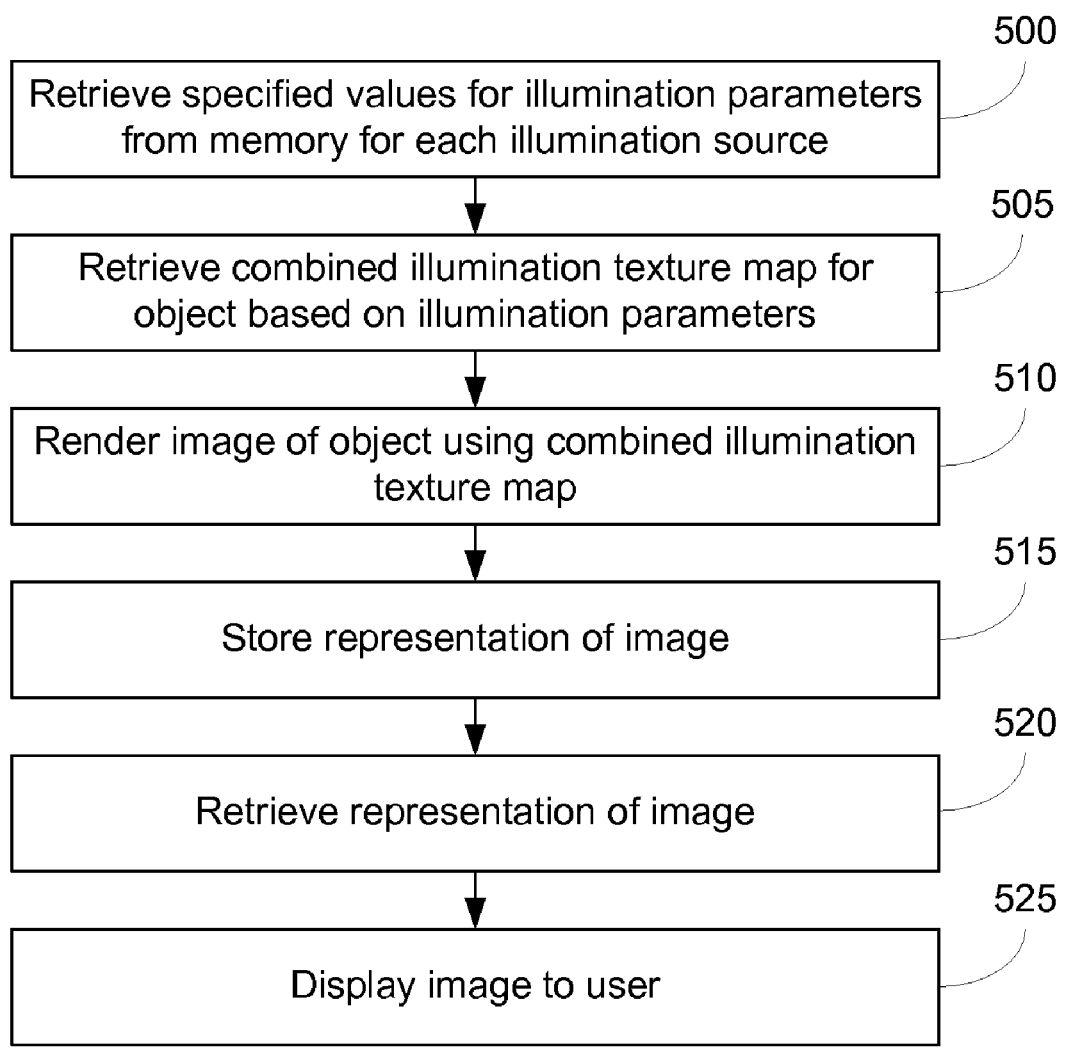
FIG. 5 is a flow diagram of a process according to an embodiment of the present invention.

FIG. 5 illustrates a flow diagram of a process according to an embodiment of the present invention. More specifically, FIG. 5 illustrates a process for a final rendering of an image.

In some embodiments of the present invention, illumination sources, including the defined values for the illumination parameters stored in step 335 (FIG. 3) or step 445 (FIG. 4), are retrieved from memory at step 500. Next, the combined texture map associated with the illumination sources is retrieved from memory at step 505. This can be, e.g., the combined texture map generated using the process of FIG. 3 or the final illumination texture map generated using the process of FIG. 4. Based upon this combined texture map, an image including the objects may again be rendered at step 510. In other embodiments, illumination-derived texture maps need not be used for a final rendering pass. Instead, conventional rendering may be performed with the values for the illumination parameters (for all light sources) that were used to generate the final combined texture map in the process of FIG. 3 or the final illumination texture map in the process of FIG. 4.

In various embodiments, the object may be placed within a live action scene, an animated scene, or the like, and rendering can include rendering a sequence of images including the object. Within the sequence, objects in the scene may move, and/or the camera may move (e.g., zoom, pan, or the like); for stationary objects, the appropriate illumination texture map can be used if desired, rather than redoing the lighting computations. It will be appreciated that if an object that has an associated illumination texture map moves relative to a light source (or if the light source moves relative to the object) during the sequence, the effect of the light source on that object may have to be recalculated. The image or a representation thereof (e.g., digital data) may then be stored in a tangible medium such as a hard disk, an optical disk, film media, or the like, step 515. Subsequently, the image or the representation of the image may be retrieved from the tangible medium, step 520 and displayed to a user, step 525. For example, the image may be displayed on a computer monitor, on a home entertainment system, a theater, a forum, or the like.

Figure 6A:
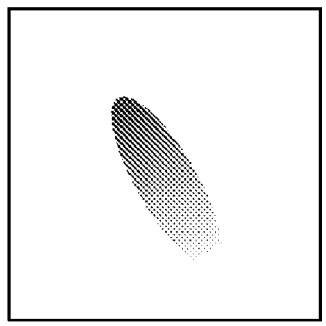
FIGS. 6A-E illustrate examples according to an embodiment of the present invention.
Figure 6B:
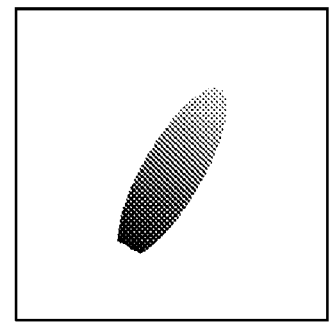
Figure 6C:
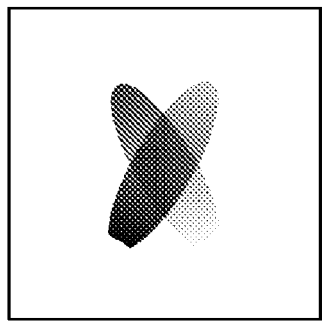
Figure 6D:
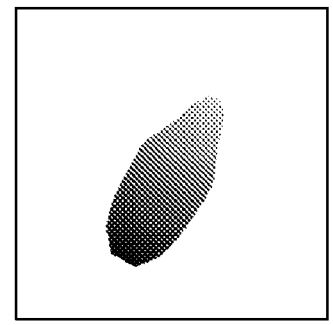
Figure 6E:
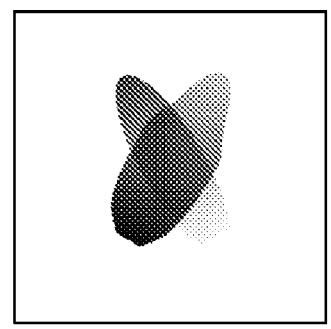

FIGS. 6A-E illustrate examples of illumination texture maps according to various embodiments of the present invention. FIGS. 6A and 6B represent texture maps determined from two different illumination sources, e.g., using the process of FIG. 2. In this example, the user has interactively tuned the parameters of the illumination sources until the effect is satisfactory. Accordingly, as illustrated in FIG. 6C, a combined illumination texture map is determined from the illumination texture maps in FIGS. 6A and 6B, e.g., using the process of FIG. 3. The process of FIG. 4 can proceed similarly, with the illumination texture map of FIG. 6A being generated in a first iteration using a first light source and the illumination texture map of FIG. 6B in a second iteration using a second light source; the texture map in FIG. 6C can result from accumulating the map of FIG. 6B into the map of FIG. 6A during the second iteration. FIG. 6D illustrates a modified beam pattern of an illumination source, as compared to FIG. 6B. FIG. 6E illustrates a combined illumination texture map example where the new beam pattern and the beam in FIG. 6A are combined into a combined illumination texture map. Thus, a single illumination texture map can include contributions from any number of light sources and can be generated iteratively.

While the invention has been described with respect to specific embodiments, one skilled in the art will recognize that numerous modifications are possible. For example, some of the texture mapping tasks and/or computation of the effect of a light source on a surface may be performed on a CPU or a GPU. In other embodiments, combinations or sub-combinations of the above disclosed invention can be advantageously made. The block diagrams of the architecture and flow diagrams are grouped for ease of understanding. However it should be understood that combinations of blocks, additions of new blocks, re-arrangement of blocks, and the like are contemplated in alternative embodiments of the present invention.

Thus, although the invention has been described with respect to specific embodiments, it will be appreciated that the invention is intended to cover all modifications and equivalents within the scope of the following claims.

What is claimed is:

1. A method for a computer system, the method comprising:
    displaying a first image rendered using a three-dimensional ("3-D") model of an object and an illumination texture map associated with the 3-D model, the illumination texture map having initial texel values that are based at least in part on an effect of a first light source on a surface of the 3-D model;
    receiving user input selecting illumination parameters for a second light source;
    rendering an updated image of the object using the illumination texture map, wherein rendering includes calculating an effect of the second light source on the surface of the 3-D model such that the updated image shows a cumulative effect of the second light source and the first light source;
    accumulating the effect of the second light source into the illumination texture map by updating one or more of the texel values based on the effect of the second light source, wherein updating the one or more of the texel values includes adding illumination values representing the effect of the second light source to the initial texel values;
    displaying the updated image; and
    storing the illumination texture map including the one or more updated texel values.

2. The method of claim 1 wherein the illumination parameters include a positioning parameter.

3. The method of claim 1 wherein the illumination parameters include at least one parameter selected from a group consisting of: illumination color, illumination intensity, illumination region, and illumination hardness/softness.

4. The method of claim 1 wherein accumulating the effect of the second light source is performed after displaying the updated image.

5. The method of claim 4 wherein accumulating the effect of the second light source is performed in response to a user input indicating that the updated image is satisfactory.

6. The method of claim 1 further comprising:
    prior to displaying the first image, selecting the illumination texture map from a library of illumination texture maps.

7. A method for a computer system, the method comprising:
    obtaining a three-dimensional ("3-D") model of an object and an illumination texture map associated with the 3-D model, the illumination texture map having initial texel values; and
    for each of a plurality of iterations, each iteration using a different one of a plurality of light sources as a current light source:
        receiving user input selecting parameters for the current light source;
        rendering an updated image of the object using the illumination texture map, wherein rendering the updated image includes calculating an effect of the current light source on a surface of the 3-D model such that the updated image includes a cumulative effect of the current light source and all of the light sources used in any previous iterations;
        accumulating the effect of the current light source into the illumination texture map by updating one or more of the texel values based on the effect of the current light source, wherein updating the one or more of the texel values includes combining illumination values representing the effect of the current light source with the texel values stored in the illumination texture map;
        displaying the updated image; and
        storing the illumination texture map including the one or more updated texel values.

8. The method of claim 7 wherein the illumination parameters include a positioning parameter.

9. The method of claim 7 wherein the illumination parameters include at least one parameter selected from a group consisting of: illumination color, illumination intensity, illumination region, and illumination hardness/softness.

10. The method of claim 7 wherein accumulating the effect of the current light source is performed after displaying the updated image.

11. The method of claim 10 wherein accumulating the effect of the current light source is performed in response to a user input indicating that the updated image is satisfactory.

12. The method of claim 7 wherein obtaining the illumination texture map includes:
    receiving a user input identifying the illumination texture map to be used.

13. The method of claim 7 wherein obtaining the illumination texture map includes defining the illumination texture map.

14. The method of claim 13 wherein defining the illumination texture map includes initializing each of the texel values to a value representing no illumination.

15. The method of claim 7 wherein accumulating the effect of the current light source includes adding illumination values representing the effect of the current light source to the texel values.

16. The method of claim 7 wherein accumulating the effect of the current light source includes performing a multiplication operation on the texel values and illumination values representing the effect of the current light source.

17. The method of claim 7 further comprising:
after the plurality of iterations, rendering one or more final images using the illumination texture map.

18. A computer system including:
a memory configured to store a three-dimensional ("3-D") model of an object and an illumination texture map associated with the 3-D model, the illumination texture map having initial texel values that are based at least in part on an effect of a first light source on a surface of the 3-D model;
a processor coupled to the memory; and
a display configured to display images rendered by the processor,
wherein the processor is configured to render a first image for the display using the 3-D model of the object and the illumination texture map; to receive user input selecting illumination parameters for a second light source; to calculate an effect of the second light source on the surface of the 3-D model; to accumulate the effect of the second light source into the illumination texture map by updating one or more of the texel values based on the effect of the second light source, wherein updating the one or more of the texel values includes adding illumination values representing the effect of the second light source to the initial texel values; to render an updated image for the display using the three-dimensional model, wherein the updated image shows the accumulated effect of the second light source; and to store the illumination texture map including the one or more updated texel values in the memory.

19. The computer system of claim 18 wherein the illumination parameters include a positioning parameter.

20. The computer system of claim 18 wherein the illumination parameters include at least one parameter selected from a group consisting of: illumination color, illumination intensity, illumination region, and illumination hardness/softness.

21. The computer system of claim 20 wherein the processor is further configured to receive user input indicating whether the updated image is satisfactory and to accumulate the effect of the second light source into the illumination texture map in response to receiving user input indicating that the updated image is satisfactory.

22. The computer system of claim 21 further comprising a manipulation device configured to receive the user input.

23. A computer program product comprising a non-transitory computer readable storage medium encoded with computer executable code for a computer system including a processor, the code comprising:
code configured to direct the processor to obtain a three-dimensional ("3-D") model of an object and an illumination texture map associated with the 3-D model, the illumination texture map having initial texel values;
code configured to direct the processor to receive user input selecting illumination parameters for a current light source;
code configured to direct the processor to render an updated image of the object using the illumination texture map, wherein rendering includes calculating an effect of the current light source on a surface of the 3-D model such that the updated image includes an accumulated effect of the current light source and all of the light sources used in any previous iterations;
code configured to direct the processor to accumulate the effect of the current light source into the illumination texture map by updating one or more of the texel values based on the effect of the current light source, wherein updating the one or more of the texel values includes combining illumination values representing the effect of the current light source with the initial texel values;
code configured to direct the processor to deliver the updated image to a display device; and
code configured to direct the processor to store the illumination texture map including the one or more updated texel values in a storage device.

24. The computer program product of claim 23 further comprising code configured to direct the processor to iterate, for each of a plurality of light sources in turn, the operations of receiving user input selecting illumination parameters for the light source, rendering an updated image, accumulating the effect of the light source into the illumination texture map, and delivering the updated image to the display device.

25. The computer program product of claim 23 wherein the illumination parameters include a positioning parameter.

26. The computer program product of claim 23 wherein the illumination parameters include at least one parameter selected from a group consisting of: illumination color, illumination intensity, illumination region, and illumination hardness/softness.

27. The computer program product of claim 23 wherein the code configured to direct the processor to accumulate the effect of the current light source into the illumination texture map is further configured to direct the processor to accumulate after delivering the updated image to the display device.

28. The computer program product of claim 23 wherein the code configured to direct the processor to accumulate the effect of the current light source into the illumination texture map is further configured to direct the processor to accumulate in response to a user input indicating that the updated image is satisfactory.

* * * * *